United States Patent [19]
Kieper

[11] Patent Number: 5,785,074
[45] Date of Patent: Jul. 28, 1998

[54] VENTED BALL VALVE WITH LOCK-OUT RING

[75] Inventor: Douglas A. Kieper, Clovis, Calif.

[73] Assignee: Nibco, Inc., Elkhart, Ind.

[21] Appl. No.: 774,734

[22] Filed: Jan. 2, 1997

[51] Int. Cl.$^6$ .............................. F16K 5/06; F16K 11/02; F16K 41/00
[52] U.S. Cl. ............... 137/68.11; 137/312; 137/625.22; 137/385; 251/214; 251/315.14
[58] Field of Search .................. 137/67 R, 68.11, 137/68.16, 68.17, 625.22, 312, 385, 625.21, 797; 251/214, 315.01, 315.14

[56] References Cited

U.S. PATENT DOCUMENTS

| | | | |
|---|---|---|---|
| 3,557,832 | 1/1971 | Mueller et al. | 137/625.22 |
| 3,684,241 | 8/1972 | Hartmann et al. | 137/625.22 |
| 4,099,543 | 7/1978 | Mong et al. | 137/625.22 |
| 4,125,128 | 11/1978 | Elward et al. | 137/625.22 |
| 4,301,823 | 11/1981 | Meisenheimer, Jr. | 137/75 |
| 4,376,445 | 3/1983 | Meisenheimer, Jr. | 137/75 |
| 4,418,887 | 12/1983 | Tubaro | 251/152 |
| 4,423,749 | 1/1984 | Schmitt | 137/315 |
| 4,548,237 | 10/1985 | Bogenschutz | 137/625.22 |
| 4,964,614 | 10/1990 | Sands et al. | 251/309 |
| 5,064,167 | 11/1991 | DiPalma | 251/214 |
| 5,102,098 | 4/1992 | Daghe et al. | 251/358 |
| 5,360,036 | 11/1994 | Kieper | 137/625.22 |

*Primary Examiner*—George L. Walton
*Attorney, Agent, or Firm*—Middleton & Reutlinger

[57] ABSTRACT

The present invention relates to a ball valve with a shear stem which can be utilized in combination with a conventional ball valve or vented ball valve. The ball valve with a shear stem is utilized with a conventional ball valve or a vented valve assembly including a valve body having a vent hole therein. The ball valve defines a body having first and second flow-through ends with a valve member receiving chamber therebetween, and a collar defining a stem receiving passage communicating with the chamber. A valve member such as a ball or cylindrical plug is disposed within the chamber. The valve member has a throughbore therein in operable alignment with the first end second flow-through ends. The vented ball valve embodiment has at least one valve member vent hole through the wall of the valve member in flow communication with the throughbore. A shear stem extends through and is rotatably mounted within the stem receiving passage and engageable with the valve member for rotating the valve member in and out of flow-through alignment. The vented valve embodiment includes a venting means in cooperation with the shear stem providing selected flow communication with the atmosphere through the valve body vent hole, between the shear stem and stem receiving passage, through the chamber, and through said valve body vent hole to the flow-through ends.

The shear stem includes a first lower continuous primary groove circumventing the stem for cooperative engagement with a primary O-ring providing a seal between the stem and the collar and a second higher continuous secondary groove circumventing the stem for cooperative engagement with a secondary O-ring. The continuous secondary groove is deeper, thicker, or shaped in a particular configuration in order to shear before the continuous primary groove in order to provide a safety means for preventing gas or liquid leakage due to shearing of the stem. In the vented ball valve embodiment the O-ring groove having an axial offset portion also serves to function as the primary groove to be used in combination with a circumferential secondary groove having a secondary O-ring. The conventional ball valve embodiment utilizes a pair of spaced apart circumferential grooves providing for a primary and secondary groove and O-ring arrangement.

13 Claims, 6 Drawing Sheets

VENTED BALL VALVE WITH LOCK-OUT RING

BACKGROUND OF THE INVENTION

1. Field of the Invention

The present invention relates to a novel valve stem and valve member arrangement to provide a shear stem assembly for use with conventional and vented ball valves providing a means of preventing leakage of gas and/or liquids due to breakage of the valve stem.

2. Description of the Prior Art

Typical ball valves utilize a ball as the sealing element which is in alignment with the axis of the stem and free to move axially. Pressure differential across the valve forces the ball in the closed position against the downstream seat and the seat against the body. In fixed ball valves, the ball rotates on stem extensions, with the bearings sealed with O-rings. Plastic seats may be compressed or spring-loaded against the ball and the body by the assembly of the valves, or they may be forced against the ball by pressure across the valve acting against O-rings which seal between the seat and the body.

The Clean Air Act of 1990 limits toxic air pollutants grouped under Title III, and OSHA regulations set forth in 40 CFR 1910 of 1992 lists chemicals that can effect the environment, and/or cause worker's personal injury if they leak or are mishandled. Because of their nature and volume in the process industries, especially in severe service, valves are a major target for controlling emissions. In addition, 40 CFR 1910 calls for various valve lock and interlock systems.

Compliance with these recent OSHA regulations require that during maintenance on a fluid "air" transfer system, the valve must seal the line, vent gases downstream, and be locked out. Assemblies have been devised to successfully accomplish this task using metal ball valves by using a split-body type of ball valve. The ball can be shaped to allow air from the downstream flow to seep between the ball and seat and out of a vent hole in the valve body when the valve is in the closed position. When the valve is in the open position the ball surface effectively closes the valve body vent hole. However, this split body arrangement is limited to use for venting metal ball valves, for the seat must be compressed very tightly between the ball and housing on the upstream side of the valve to prevent leakage. A metal ball in combination with a metal housing and/or metal seat can be used; however, valves having the components made of plastic are susceptible to deformation of the plastic upon tightening the ball against the seat or housing. This limitation limits the use and effectiveness of vented plastic ball valves constructed in the same manner as vented metal ball valves.

The venting means described herein can be used for venting most any type of metal or plastic ball or plug type valve. The plastic ball valve described herein has a dropout type of valve body so that the valve may be removed from a piping system for repair or replacement and provides a good seal using a minimum number of molded parts made of plastic materials, such as polyvinyl chloride and the like.

The shear stem described herein utilizes a primary and secondary circumferential grooves and O-rings to form a seal against the stem receiving passage of the collar or bonnet of a conventional or vented ball valve. The upper circumferential groove is designed to shear before the lower circumferential groove to maintain the integrity of the seal.

In the vented ball valve embodiment the O-ring groove having an axial offset portion also serves to function as the primary groove to be used in combination with a circumferential secondary groove having a secondary O-ring. The conventional ball valve embodiment utilizes a pair of spaced apart circumferential grooves providing for a primary and secondary groove and O-ring arrangement.

SUMMARY OF THE INVENTION

The shear stem includes a first lower continuous primary groove circumventing the stem for cooperative engagement with a primary O-ring providing a seal between the stem and the collar and a second higher continuous secondary groove circumventing the stem for cooperative engagement with a secondary O-ring, wherein the continuous secondary groove is deeper, thicker, or shaped in order to shear before the continuous primary groove in order to provide a safety means for preventing gas or liquid leakage due to shearing of the stem.

The vented valve assembly of present invention includes a valve body having a vent hole therein, and first and second flow-through ends with a valve member receiving chamber thereinbetween, and a stem receiving passage communicating with the chamber. A valve member is disposed within the chamber. The valve member has a throughbore therein in operable alignment with the first end second flow-through ends and at least one valve member vent hole through the wall of the valve member in flow communication with the throughbore. A stem extends through and is rotatably mounted within the stem receiving passage and engageable with the valve member for rotating the valve member in and out of flow-through alignment. A venting means in cooperation with said stem provides selected flow communication with the atmosphere through the valve body vent hole, between the stem and stem receiving passage, through the chamber, and through said valve body vent hole to the flow-through ends.

The atmospheric venting means includes a generally axial groove including at least one offset arched portion around about a portion of its circumference. The axial groove and offset have an annular sealing member disposed therein forming a seal between the stem and stem receiving passage. The offset arched portion and annular sealing member therein are rotatably aligned so that rotation of the stem rotates the valve member out of operable alignment with the first and second flow-through ends, and positions the offset arched portion and annular sealing member therein in sealing engagement with the stem receiving passage above the valve body vent hole. Venting flow communication is provided from the valve flow-through end, through the valve member vent hole, between the stem and the stem receiving passage, and through the valve body vent hole to the atmosphere. Rotation of the valve member to the selected flow-through alignment by rotation of the stem positions the offset arched portion and annular sealing member therein in sealing engagement with the stem receiving passage below the valve body vent hole sealing the stem receiving passage from the atmosphere.

More particularly, the ball valve of the present invention includes a pair of end connectors detachably held respectively against a tubular valve body having a valve member receiving chamber between the first and second flow-through ends providing a flow passage therethrough, and a stem receiving passage or bonnet extending upward from and communicating with the valve member receiving chamber. A seal carrier retaining a seal member is slidably mounted in at least one end of the valve body seating a rotatable valve ball actuated by a handle detachably engaging a valve stem exteriorly of the body. The valve stem has a generally axial groove including an offset arched portion around a portion of the circumference and an annular sealing member such as an O-ring seated within the axial groove and offset. The stem is rotatably secured within a bore or stem receiving passage extending through the valve bonnet which is an integral part of the valve body. The valve ball is positioned within the valve member receiving chamber and held in contact with an annular seal carried by the carrier and the valve body. The carrier and annular seal thereon are held in limited radial centering movement by a retainer ring detachably engaging the valve body sealing ring and providing for a tightening adjustment of the parts of the assembly when wear occurs upon the seals. A pair of threaded union nuts serve to join the connectors detachably to the valve body by threadably engaging with external threads on the ends of the valve body. A detachable handle engages the distal end of the valve stem and serves to rotate the ball valve in operable alignment between its open flow permitting and closed flow blocking positions.

The ball valve includes a dovetail slot into which a correspondingly shaped key on the lower end of the valve stem is detachably engaged having a stem mounted within a stem receiving passage or bore extending laterally from the portion of the valve body forming a collar or bonnet. The valve ball includes a vent hole in selectable fluid communication with a sealable passage between the stem and the stem receiving passage and a vent hole in the valve body.

In the valve open position, the main flow passage of the valve ball is aligned with the passage in the valve body, and the ball vent hole is sealed against the side wall of the valve body and between the annular seals seating the valve ball. The annular sealing member or O-ring seated within the axial groove around the circumference of the stem is biased against the stem receiving passage and forms an air and water tight seal between the stem and the stem receiving passage of the valve body below the vent hole in the valve bonnet to prevent the escape of vapor or fluid from the valve body during use. Rotation of the handle to the valve closed position, rotates the stem and valve ball so that the ball vent hole is open to vent the downstream fluid flow through the ball vent hole in the valve ball to the throughbore and into the chamber upward between the annular seals seating the ball and the valve body, and between the lower portion of the stem and the stem receiving passage of the bonnet. The O-ring provides a seal between the top portion of the stem attached to the handle and the lower portion of the stem providing a passage for the venting of vapor of fluid to the atmosphere or appropriate container through the vent hole in the valve bonnet positioned below the offset portion of the O-ring.

It is an object of the present invention to provide a venting means for a plastic ball or plug valve to enable the user to rotate the handle one quarter turn to close the valve and to vent vapor or liquid from the downstream flow through the valve ball, stem, and valve body bonnet vent hole.

It is a further object of the present invention to provide a inexpensive sealing and venting control mechanism employing an annular sealing member within an axial groove within the body of the stem, whereby the groove has at least one offset, upward extending arch on one side for providing a seal either below or above the valve body bonnet vent hole depending upon the rotation of the stem by the handle.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

Figure 1:
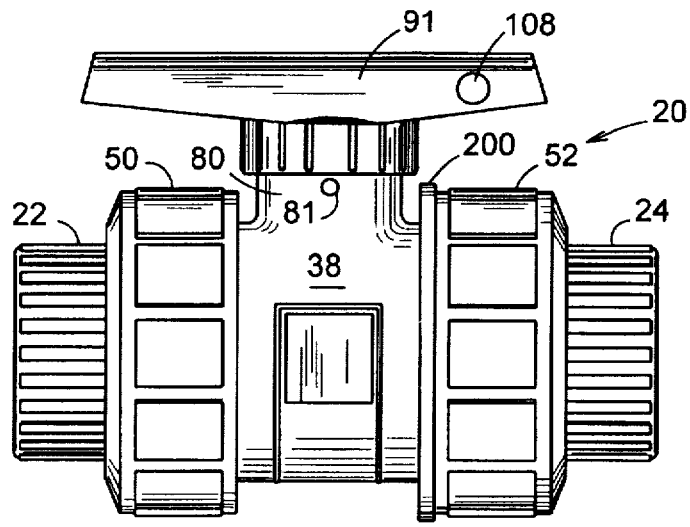
FIG. 1 is a side view of the present invention showing the vented ball valve and shear stem.
Figure 2:
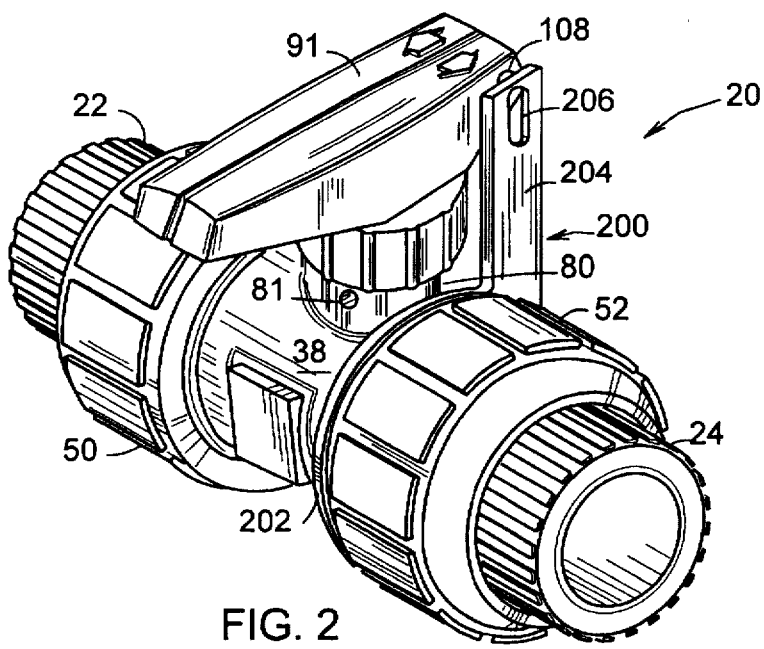
FIG. 2 is a perspective view of the vented ball valve and shear stem of FIG. 1.
Figure 3:
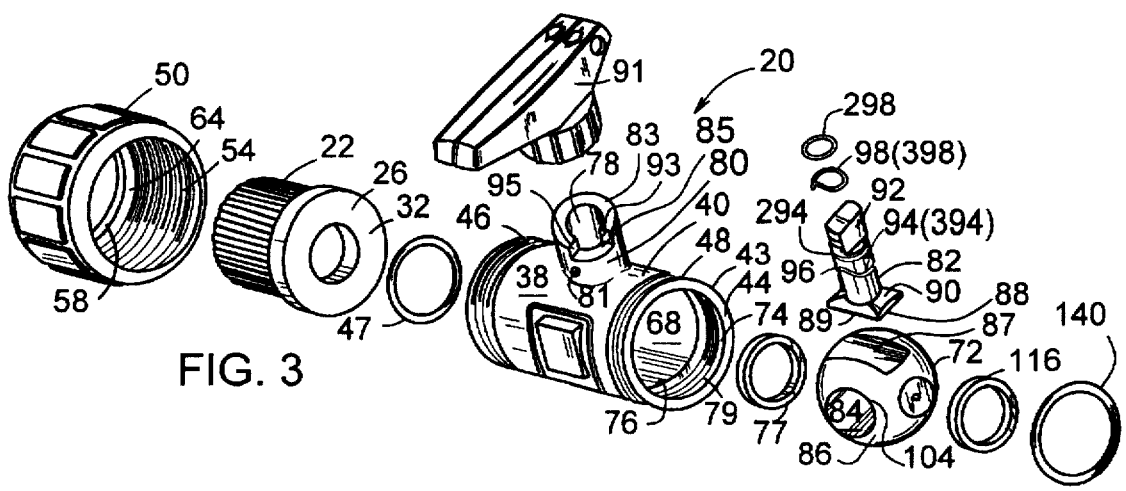
FIG. 3 is an exploded perspective view of the vented ball valve and shear stem of FIG. 1.
Figure 4:
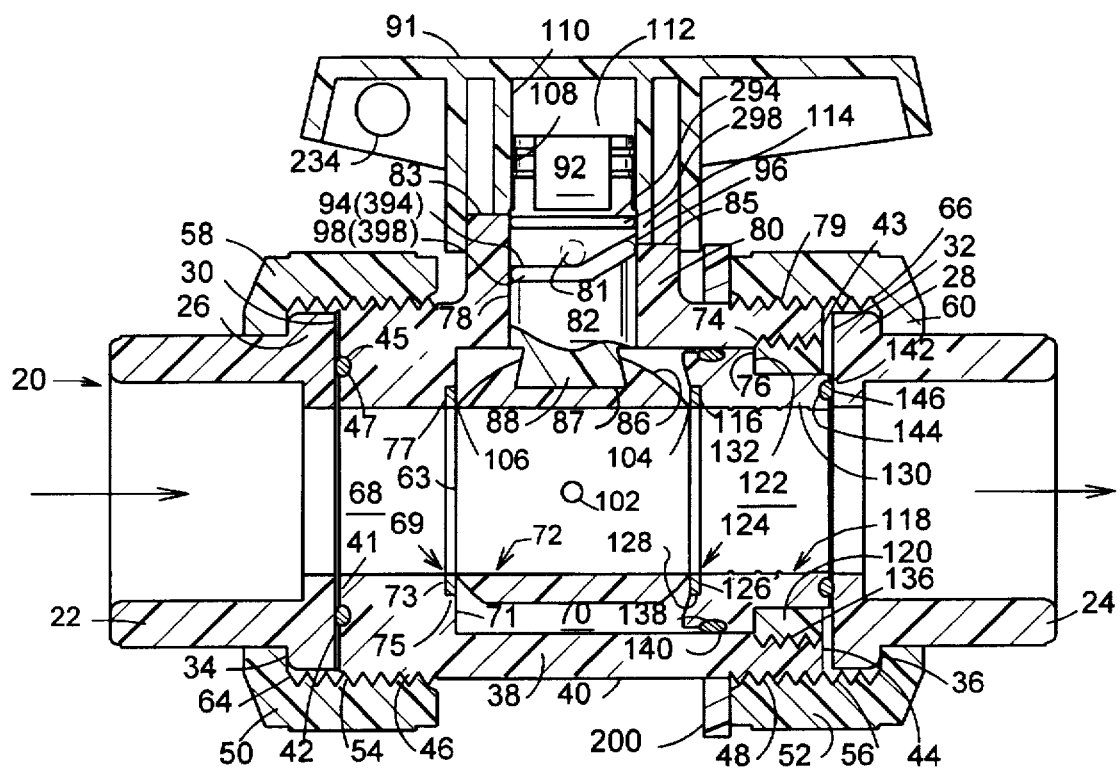
FIG. 4 is a longitudinal sectional view of the vented ball valve and shear stem assembly of FIG. 1 showing the ball in the fully open flow position wherein the flow is from left to right.
Figure 12:
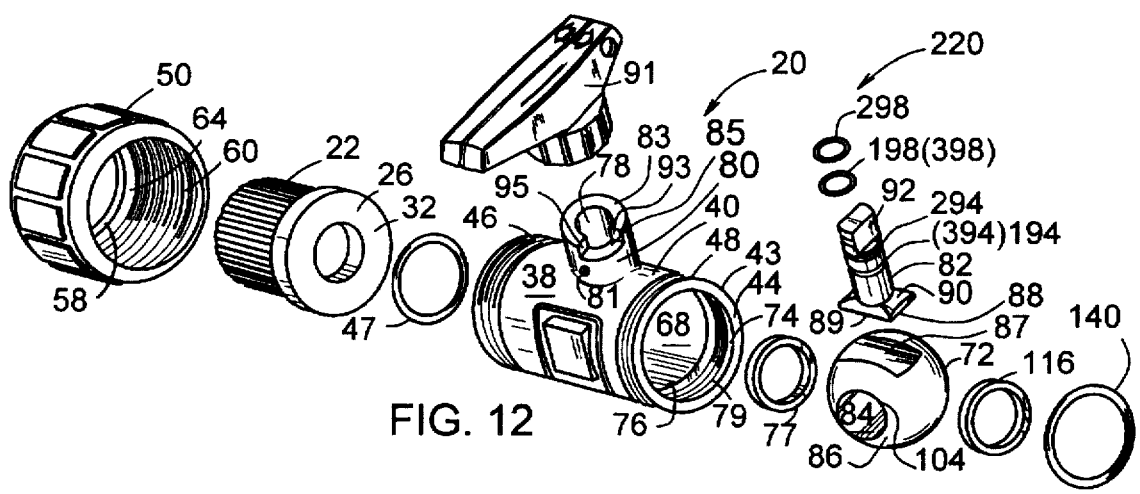
FIG. 12 is an exploded perspective view of a conventional non-vented ball valve and shear stem assembly.

The present invention describes a means of venting a plastic ball valve. More particularly, a thermoplastic ball valve of the end entry type such as is described in U.S. Pat. Nos. 3,550,902, 4,099,705, 4,257,575, 4,449,694, and 5,360,036) hereby incorporated by reference. Depicted in FIGS. 1 and 2 is an end entry vented ball valve assembly 20 having a shear stem 82 constructed in accordance with a preferred embodiment of the present invention. The vented ball valve assembly 20, as illustrated in FIGS. 3 and 4, and the conventional ("nonvented") ball valve assembly 220 as illustrated in FIG. 12, are both adapted for connection in general longitudinal alignment with a pair of fluid conduits, such as pipes, by means of conventional end connectors 22 and 24. The end connectors 22, 24 have axial flow passages and provide sockets adapted to engage the fluid conduits as shown; however, it is contemplated that the end connectors 22, 24 may be interiorly threaded to serve as means for attaching pipes. The end connectors 22, 24 are provided with generally radially outwardly extending flanges 26 and 28, respectively. Each flange 26, 28 has a substantially radial face 30, 32 and a frustoconical surface 34, 36 which tapers radially inwardly and away from the radial face 30, 32.

Figure 5:
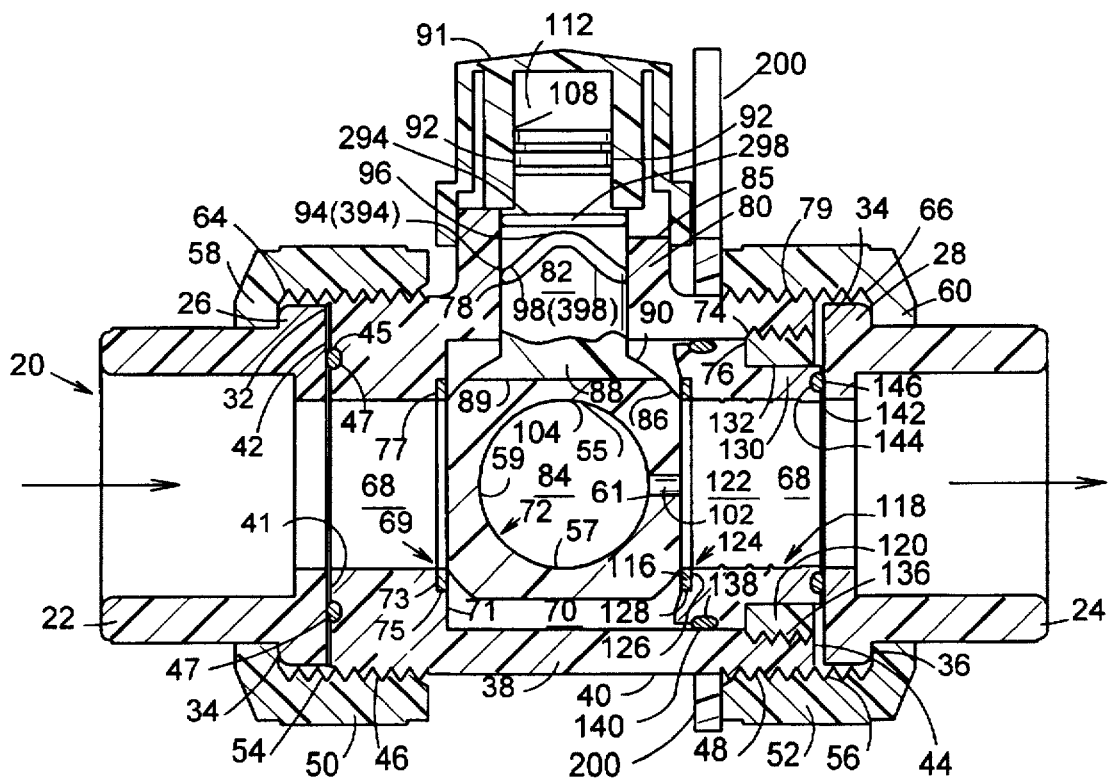
FIG. 5 is a longitudinal sectional view of the vented ball valve and shear stem assembly of FIG. 1 showing the ball in the fully closed flow position wherein the flow is from left to right.
Figure 13:
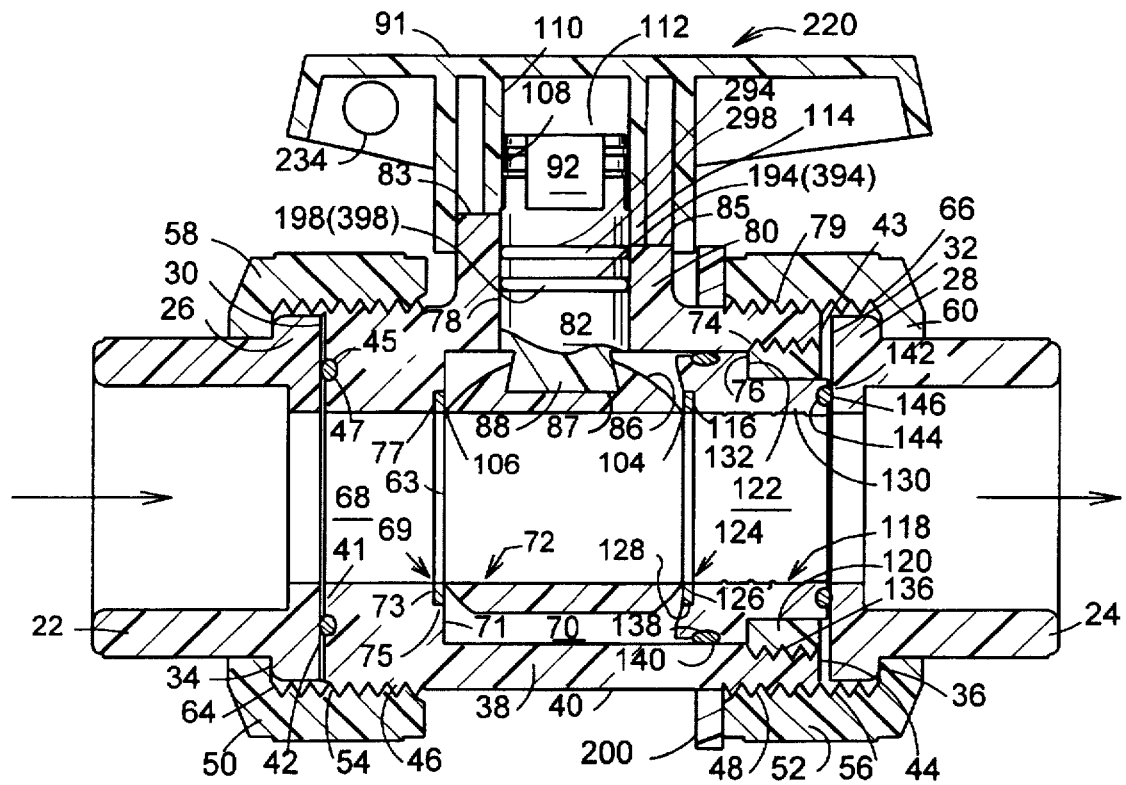
FIG. 13 is a longitudinal sectional view of a conventional ball valve and shear stem assembly of FIG. 12 showing the ball in the fully open flow position wherein the flow is from left to right.
Figure 14:
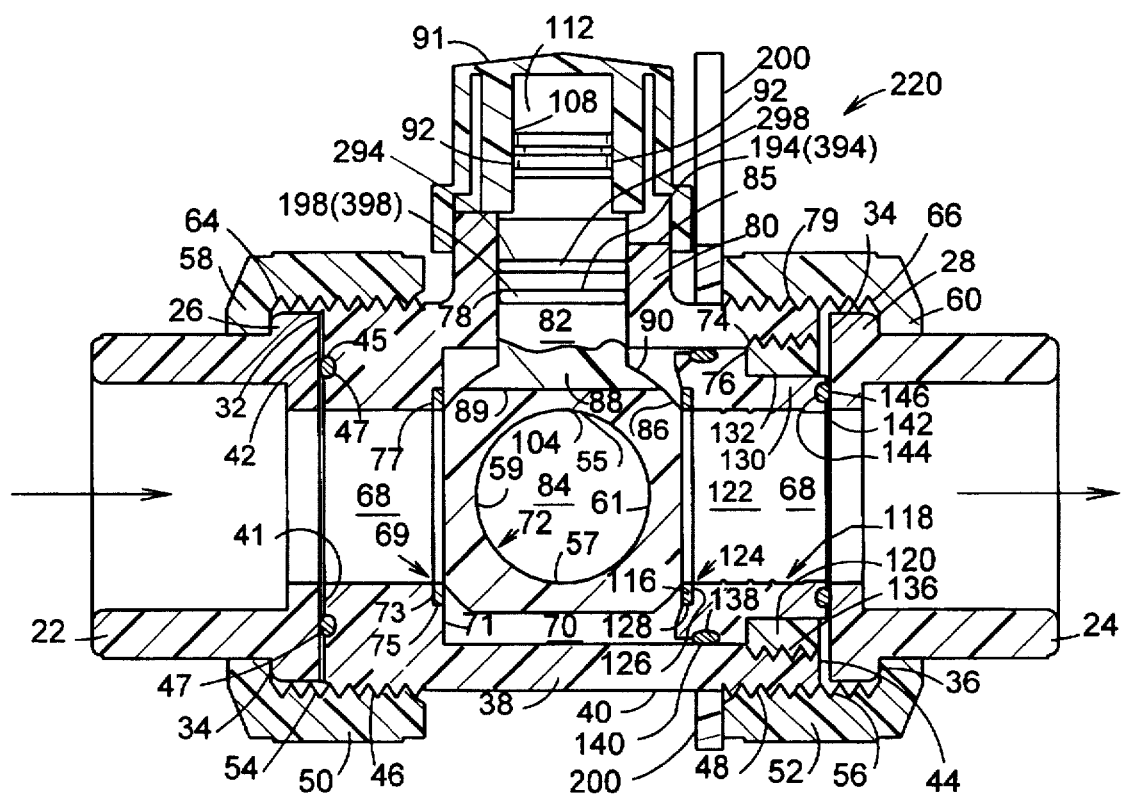
FIG. 14 is a longitudinal sectional view of the conventional ball valve and shear stem assembly of FIG. 12 showing the ball in the fully closed flow position wherein the flow is from left to right.

The vented ball valve 20 as shown in FIGS. 4 and 5, and the conventional ball valve 220 as shown in FIGS. 13 and 14, include a main tubular valve body portion 38 having a generally cylindrical external surface 40. The tubular valve body 38 extends from a wall 41 having a first generally radial end face 42 at one end of the body to an annular edge 43 having a second generally radial end face 44 at the opposite end of the body 38. An annular retaining groove 45 disposed within the radial outer end face 42 of the valve body wall 41 contains a resilient sealing and biasing member such as an end connector O-ring 47 which abuts the radial face 30 of the flange 26 of first end connector 22 to further assist in sealing of the assembly. Each end of the external surface 40 of the body 38 is provided with an externally threaded end portion 46, 48. Union nuts 50, 52 include a threaded cylindrical portions 54, 56 on their inner surfaces threadably engageable with the threaded end portions 46, 48 of the tubular valve body 38. Extending radially inwardly from one end of the cylindrical threaded portions 54, 56 of each union nut 50, 52 is a flange 58, 60 which presents a central opening adapted to slide longitudinally on the outer circumference of the corresponding end connectors 22 and 24, respectively. The union nut flanges 58, 60 include an internal frustoconical surface 64, 66 that tapers radially inwardly and away from the main tubular valve body 38 so that it corresponds to the adjacent frustoconical surfaces 34, 36 of the end connector flanges 26, 28. Accordingly, when the union nuts 50, 52 are tightened onto the main valve body portion 38, the radially extending union nut flanges 58, 60 imposes longitudinal forces on the end connectors 22 and 24.

The open-ended, main tubular valve body 38 is provided with a longitudinally extending flow passage 68 extending therethrough from the first generally radial end face 42 through the wall 41 to the second generally radial end face 44 of the annular edge 43. The flow passage 68 includes a plurality of axially extending, generally cylindrical sections of various diameters.

One such section forms an annular receiving recess 69 within an inner radial end face 71 of end wall 41 of the tubular valve body 38 as illustrated in FIGS. 4–5 and 13–14. The annular receiving recess 69 includes an axially facing end wall 73 and a radially facing guide wall 75 for receiving a first annular support seal member 77, preferably made of teflon for seating and sealing the valve ball 72 with the tubular valve body 38.

Another axial recess positioned generally centrally of the main valve tubular body 38 defines a valve member receiving chamber 70. As shown in FIGS. 3–4 and 13–14, the valve member receiving chamber 70 is essentially the same diameter as the flow passage 68, wherein at least one end of the main tubular valve body 38 is sufficiently enlarged for endwise insertion of a valve member, more particularly a valve ball 72, into the valve member receiving chamber 70; however, the valve member receiving chamber may be cylindrically shaped to house a substantially cylindrical plugged shaped valve member as well. Such a plug shaped valve member may comprise a cylindrical member or a tapered cylindrical valve member.

An axially, inwardly extending counterbore 74 is provided between the valve member receiving chamber 70 and the end 43 of the tubular valve body 38. The counterbore 74 defines an internal shoulder 76 spaced apart from the first end 42 of the main body 38 by a predetermined axial distance having a threaded inner surface 79 therealong. It is contemplated that another counterbore 74 structure could be used to replace the wall 41; however, only one end of the valve body 38 need by open to accommodate the valve ball member 72.

A bore or stem receiving passage 78 extending downward through the collar or bonnet 80 defines an axis substantially perpendicular to the longitudinal axis of the longitudinal passage 68 through the tubular valve body 38 communicating with the valve member receiving chamber 70. The outwardly projecting collar or bonnet 80 formed integral with the main tubular body 38 provides additional lateral support for a substantially cylindrical valve shear stem 82 received within the bonnet stem receiving passage 78. In the vented ball valve embodiment 20, a vent hole 81 is disposed through the valve body bonnet 80 between the top of the bonnet 80 and the tubular portion of the valve body 38 for venting vapor and liquid fluids trapped under pressure in a downstream section of the conduit when the valve is rotated to the close position.

In both the vented ball valve 20 and the conventional ball valve 220, the upper end of the bonnet 80 terminates in stepped planes with the upper plane 83 extending through 270 degrees and the lower plane 85 extending through 90 degrees to form stops 93, 95 against which a handle 91 may abut when moving the valve into fully opened or fully closed positions by rotating the handle 91 one quarter turn.

A nipple may extend coaxially around the vent hole 81 of the vented ball valve 20, or a deflector may partially enclose the vent hole 81 to provide a means for directing the flow of the pressurized fluid from the vent hole 81. A conduit may be attached to the nipple to direct fluids from the vent hole 81 to a suitable storage container for reuse or disposal.

Figure 6:
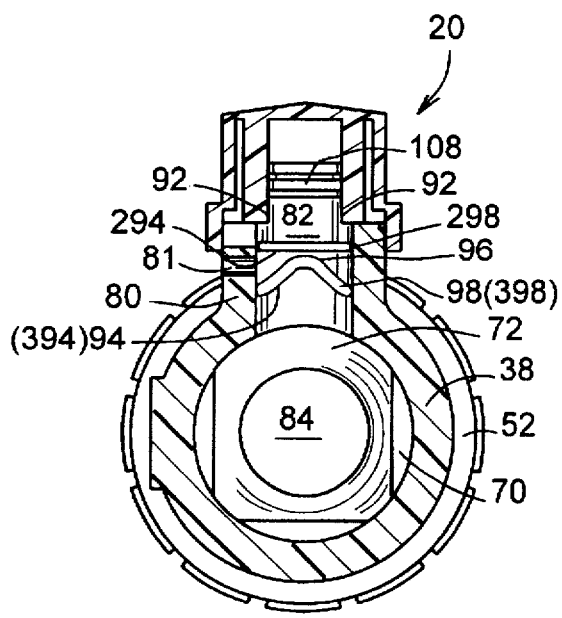
FIG. 6 is a transverse sectional downstream end view of the vented ball valve and shear stem assembly of FIG. 1 with the stem and ball valve member positioned in the open valve position showing the annular sealing member O-ring extending below the valve body bonnet vent hole sealing the vent, and showing the ball valve member in the fully open flow position wherein the flow is from left to right.
Figure 7:
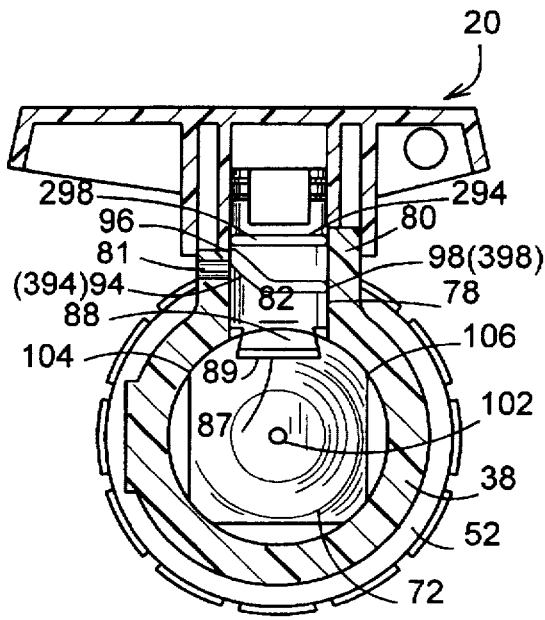
FIG. 7 is a transverse sectional downstream end view of the vented ball valve and shear stem assembly of FIG. 1 with the stem and ball positioned in the closed valve position showing the arched portion of the axial groove having an O-ring therein extending above the valve body bonnet vent hole and showing the ball in the fully open flow position wherein the flow is from left to right.
Figure 10:
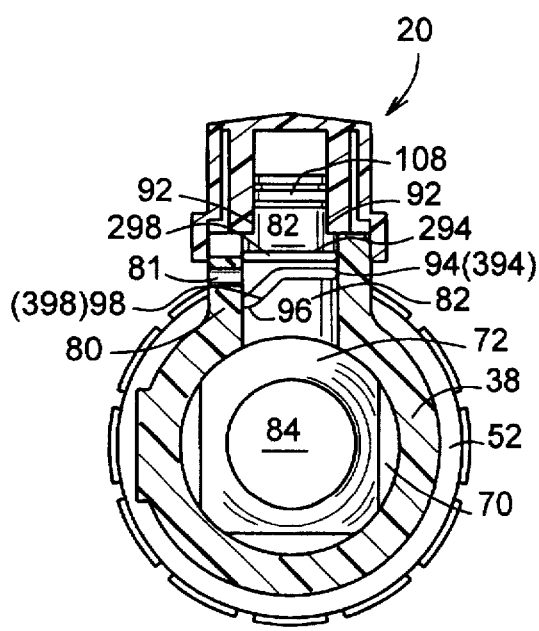
FIG. 10 is a transverse sectional downstream end view of the vented ball valve and lock-out ring assembly with the stem and ball valve member positioned in the open valve position showing the stem having an axial groove with a downward offset portion containing an annular sealing member O-ring extending below the valve body bonnet vent hole sealing the vent, and showing the ball valve member in the fully open flow position wherein the flow is from left to right.
Figure 11:
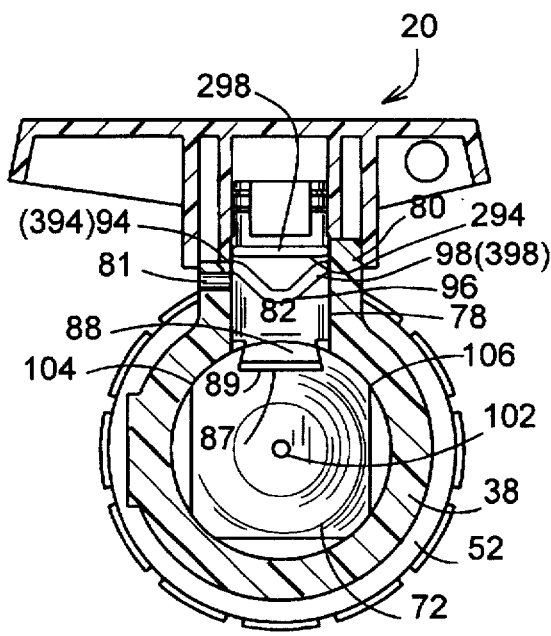
FIG. 11 is a transverse sectional downstream end view of the vented ball valve and lock-out ring assembly with the stem and ball positioned in the closed valve position showing an axial groove having a downward offset portion including an annular sealing member O-ring therein extending above the valve body bonnet vent hole and showing the ball in the fully open flow position wherein the flow is from left to right.

The valve ball member 72 of both the vented ball valve 20 and conventional ball valve 220 include a throughbore 84 therethrough. More particularly, the valve member 72 of the preferred embodiment as shown best in FIGS. 3–5 and 12–14, is a generally spherical valve ball 72 defining a top wall 55 connected to a bottom wall 57 by a first flow blocking side wall 59 and a second flow blocking side wall 61, and a pair of end walls 63 including a central throughbore 84 therethrough defining a flow passage is detachably engageable with the valve shear stem 82. The valve ball 72 is rotatable about a rotational axis substantially perpendicular to the axis of the central bore 84. The generally spherical shape of the ball valve 72 provides a sealing surface in cooperation with the valve body 38. The external surface 86 of the valve ball 72 has a nominal diameter which is less than the nominal diameter of the valve member receiving chamber 70 so that the tubular valve body 38 does not interfere with the rotation of the valve ball 72 about its axis between its "valve open" flow permitting position of FIGS. 4, 6, and 13, and the "valve close" flow blocking position of FIGS. 5, 7, and 14.

As shown in FIGS. 4–5 and 13–14, the stream of flow through the valve is from left to right; therefore, when the ball valve member 72 is in the closed position as shown in FIG. 5 and 14, rotating the handle 91 one-quarter turn counterclockwise rotates ball valve member 72 aligning the throughbore 84 with the axis of the tubular valve body 38 and conduits as shown in FIG. 4 and 13.

In the vented ball valve 22, a generally centrally located ball valve member vent hole 102 is disposed through the downstream valve ball side wall, shown as second ball wall 61 and through the external ball surface 86 directed toward the downstream end 44 of the tubular body having the annular edge 43 during the valve closed position. The portion of the central bore 84 intersecting the external surface 86 of the ball 72 forms open end side walls defining central flattened peripheral edges 104, 106 which permit vapor or liquid fluid entering the central bore 84 from the ball vent hole 102 to flow from the interior of the ball 72 around the peripheral edges 104, 106 upward between the valve shear stem 82 and the valve bonnet stem receiving passage 78.

Both the vented ball valve 22 and the conventional ball valve 220 incorporate a recess or groove 87 which is generally perpendicular to both the ball rotational axis and to the bore 84, is provided in the valve ball 72 at a location where it does not interfere with the sealing portion of the external ball surface 86. The groove 87 has a dovetail cross-sectional configuration extending completely across the ball 72 adapted to receive a correspondingly configured stem end portion. A complementary stem end portion terminates at its lower end in a key 88 having a flat lower surface 89 and an arcuate upper surface 90 corresponding generally to the upper surface of the ball at the point of their engagement as shown in FIGS. 3, 7, 12, and 11.

The generally cylindrical valve shear stem 82 is provided with an inner stem sealing member comprising an inner continuous circumferential primary groove 394 circumventing the shear stem 82 for cooperative engagement with a primary annular sealing member 398 such as an O-ring providing a seal between the shear stem 82 and the bore of the stem receiving passage 78 of the bonnet 82 positioned above the valve member 84; and an outer stem sealing member comprising an outer continuous secondary groove 294 circumventing the shear stem 82 for cooperative engagement with a secondary annular sealing member 298 such as an O-ring providing a auxiliary safety seal between the inner stem sealing member and the atmosphere.

The outer continuous secondary groove 294 is deeper, thicker, or shaped in a particular easy shear configuration, defining a deep "V" shaped channel, defining a wide channel, and/or defining deep channel, in order to shear before the inner continuous primary groove 394 in order to provide a safety means for preventing gas or liquid leakage due to shearing of the shear stem 82. In the vented ball valve embodiment 22 the inner annular sealing member comprising an O-ring groove 94 having an axial offset portion 96 also serves to function as the primary groove 394 to be used in combination with a circumferential secondary groove 294 having a secondary annular member 298 such as an O-ring. The conventional ball valve embodiment 220 utilizes a pair of spaced apart circumferential grooves 394, 294 providing for a primary and secondary groove and O-ring arrangement.

More particularly, in the vented ball valve 22, the inner primary circumferential groove 394 of the inner stem sealing member defines a generally centrally located, generally horizontal axial groove 94 having an offset forming an upwardly extending arch 96 around a portion of its circumference. The primary annular sealing member 398 disposed therein such as a conventional O-ring 98 is sealably engageable with the groove 94 and offset arch 96 and the stem receiving passage 78 of the bonnet 80, forming a vapor and liquid tight seal between the shear stem 82 and the stem receiving passage 78 and between the valve member 84 and the outer stem sealing member as shown along a longitudinal axis in FIGS. 4 and 5, and shown in an end view in FIGS. 6 and 7. In this manner a fluid seal is selectively effected between the stem receiving passage 78 and the valve stem 82 above or below the bonnet vent hole 81. The upper end of the shear stem 82 includes parallel sidewalls 92 and may have at least one ridge 108 extending horizontally outward from the cylindrical portion of the stem located between the parallel sidewalls 92 to provide a friction fit with a handle 91.

In the conventional ball valve 220, the inner primary circumferential groove 394 of the inner stem sealing member defines a generally centrally located, generally horizontal circumferential groove 194 extending around its circumference. The primary annular sealing member 398 disposed therein such as a conventional O-ring 198 is sealably engageable with the groove 194 and the stem receiving passage 78 of the bonnet 80, forming a vapor and liquid tight seal between the shear stem 82 and the stem receiving passage 78 as shown along a longitudinal axis in FIGS. 13 and 14, and shown in an end view in FIGS. 15 and 16 above the valve member 84. In this manner, even if excessive force or damage occurs to the portion of the valve stem or handle breakage of the shear stem 82 is controlled at the weakest point being the outer stem sealing member; thereby, enabling a fluid seal to be maintained by the inner stem sealing member between the stem receiving passage 78 and the valve shear stem 82. The upper end of the shear stem 82 includes parallel sidewalls 92 and may have at least one ridge 108 extending horizontally outward from the cylindrical portion of the stem located between the parallel sidewalls 92 to provide a friction fit with a handle 91.

Figure 8:
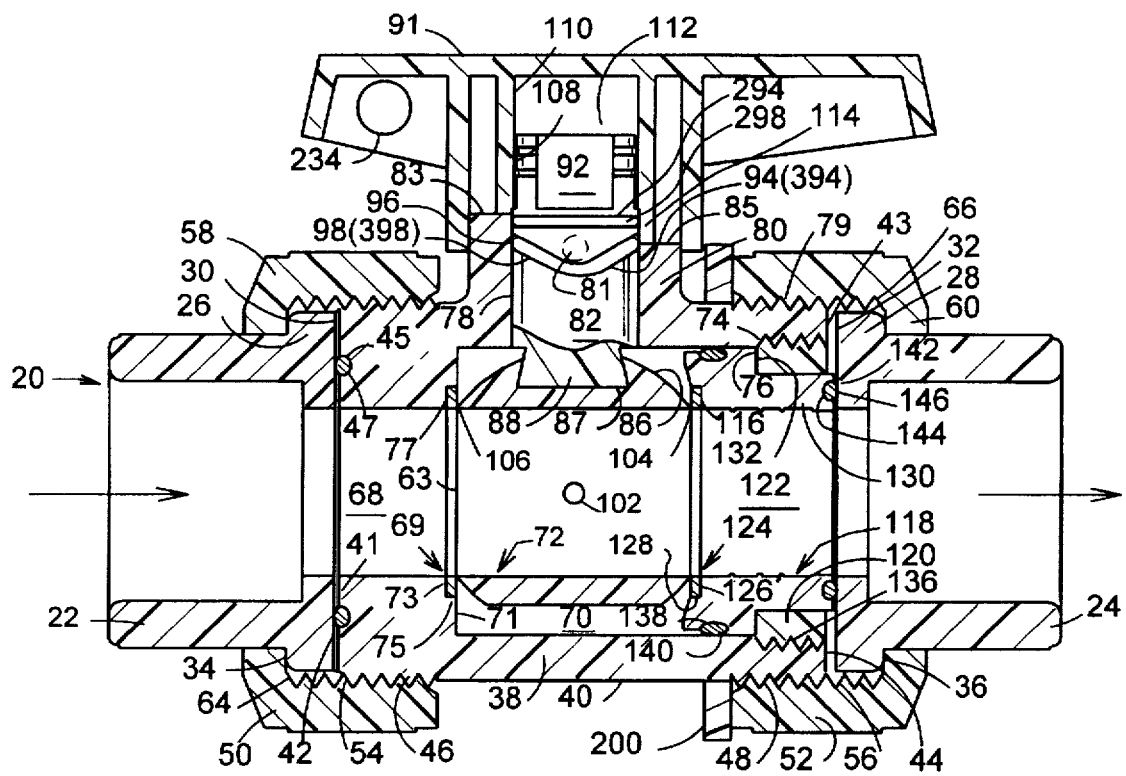
FIG. 8 is a longitudinal sectional view of the vented ball valve and lock-out ring assembly showing a vent in the valve body bonnet and a stem having an axial groove having a downward offset portion including an annular sealing member therein, wherein the stem and valve ball member is aligned in the flow-through position wherein the flow is from left to right.
Figure 9:
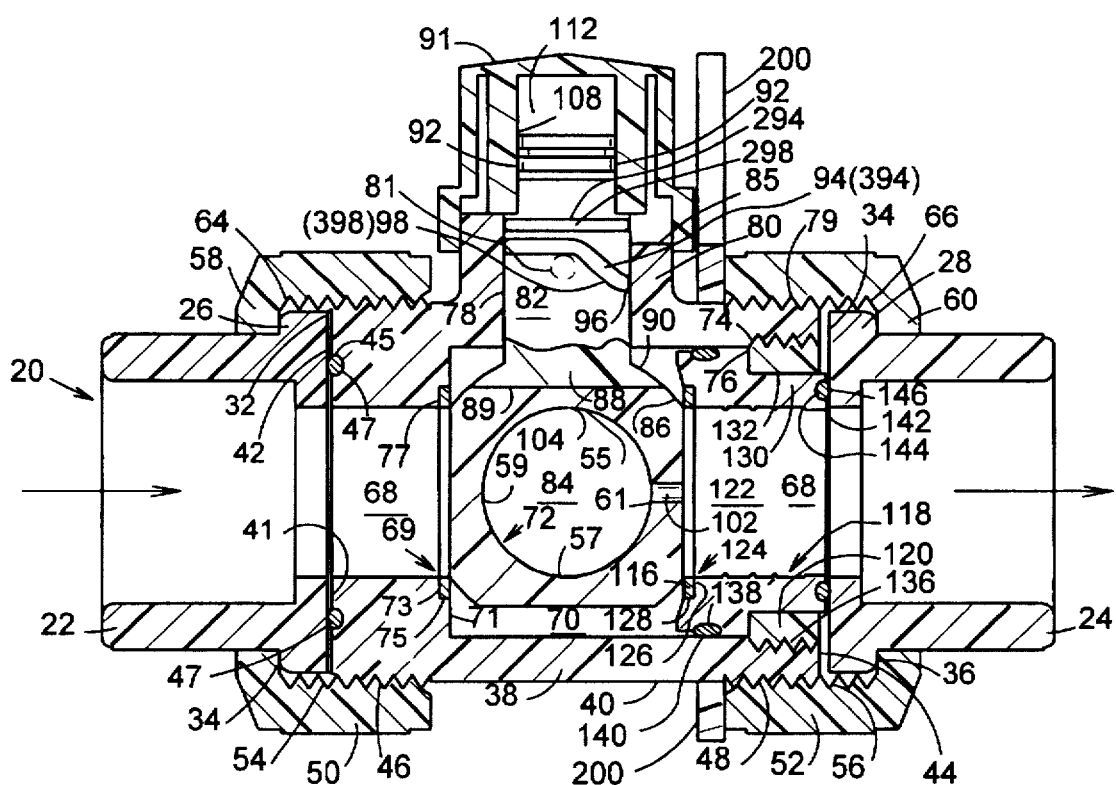
FIG. 9 is a longitudinal sectional view of the vented ball valve and lock-out ring assembly showing a vent in the valve body bonnet and a stem having an axial groove having a downward offset portion including an annular sealing member therein, wherein the stem and valve ball member is aligned out of the flow-through position wherein the flow is from left to right.
Figure 15:
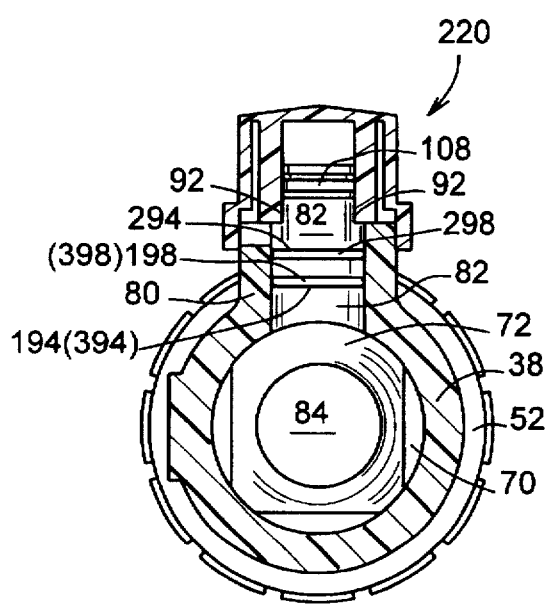
FIG. 15 is a transverse sectional downstream end view of the conventional ball valve and shear stem assembly of FIG. 12 with the stem and ball valve member positioned in the open valve position showing the primary annular sealing O-ring positioned below the secondary annular sealing O-ring and showing the ball valve member in the fully open flow position wherein the flow is from left to right.
Figure 16:
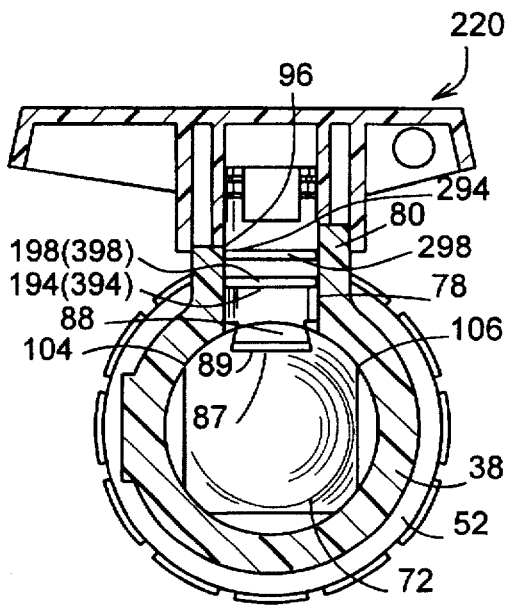
FIG. 16 is a transverse sectional downstream end view of the conventional ball valve and shear stem assembly of FIG. 12 with the stem and ball positioned in the closed valve position showing the primary annular sealing O-ring positioned below the secondary annular sealing O-ring and showing the ball in the fully open flow position wherein the flow is from left to right.

FIGS. 4,8, and 15 show the handle 91 to include a downwardly extending integral web 110 having a recess (not shown) therein for receiving the upper end of the valve shear stem 82. A shoulder 114 is formed integrally with the web 110 to engage with the stops 93, 95 of the bonnet 80 when the assembled handle 91, shear valve stem 82, and valve ball 72 are rotated the proper distance. In the preferred embodiment the handle 91 is simply press fitted onto the shear stem 82 so that the ridges 108 of the shear stem 82 provide a tight friction fit with the web 110 of the handle 91. A detachable fastening clip (not shown) may be attached to the web 110 of the handle 91 to provide a shim adapted to cooperate with the parallel sidewalls 92 to enhance the gripping action of the between the web 110 of the handle 91 and the upper portion of the shear stem 82.

As shown in FIGS. 3–5 and 12–14, for both the vented ball valve 22 and conventional ball valve 220, the valve ball 72 detachably engageable with the valve shear stem 82 and is normally confined between the first annular support seal member 77 and a similar second annular support seal member 116 mounted within a tubular bifurcated seal carrier 118. The seal carrier 118 is slidably received in the ball entry annular edge end 43 of the main tubular valve body 38 and held adjustably into position by an adjustable retainer ring member 120 threadedly engaged with the threaded inner surface 79 of the tubular body 38.

The seal carrier 118 includes a longitudinal bore 122 having a diameter substantially equivalent to the diameter of the valve ball 72 throughbore so that the fluid passing through the tubular valve body portion 38 is substantially unrestricted by the presence of the seal carrier 118 and valve ball 72. The leading end of the seal is provided with an annular receiving recess 124 which includes an axially facing end wall 126 and a radially facing guide wall 128 for receiving the second annular support seal member 116, preferably made of teflon for seating and sealing the valve ball 72 within the tubular valve body 38. The seal member 116 is dimensioned for limited radial centering movement in the receiving recess 124.

The leading end of the seal carrier 118 has a larger external diameter and the trailing portion 130 has a smaller external diameter to define a shoulder 132. The external diameter of the trailing portion 130 of the seal carrier 118 is less than the interior diameter of the bore 134 of the retainer ring 120 permitting a coaxial fit of the retainer ring 120 around the trailing portion 130 so that the retainer ring slidably abuts the shoulder 132 of the seal carrier 120. The exterior diameter 136 of the retainer ring 120 is threaded and sized according to the diameter of the threaded inner surface 79 of the tubular valve body 38 for threadedly engagement therein. The retainer ring 118 provides for axial movement of the seal carrier 118 against the valve ball 72 for adjustment within the tubular body 38.

The seal carrier 118 is provided with a circumferential groove 138 that receives a peripheral seal member 140 such as an O-ring to prevent fluid from leaking between the seal carrier 118 and the throughbore of the tubular valve body 38.

The end of the seal carrier trailing portion 130 defines an end wall 142 having an annular retaining groove 144 disposed therein. An annular, resilient sealing and biasing member, such as a "VITON®" O-ring 146 is received in the groove 144 to provide a fluid seal between the axial facing walls of the seal carrier 118 and the flange 28 of second end connector 24. In addition, the O-ring 146 provides an axial force biasing the seal carrier 118 toward the valve ball 72.

Assembly of the vented ball valve 20 in this manner, wherein the valve shear stem 82 is contained within the bonnet stem receiving passage 78 and is provided with an O-ring 98 mounted within a axial groove 94 having an offset within the shear stem body 82 provides a novel venting means with a breakaway shear stem 82. The valve 20 of the preferred embodiments 22 uses a typical thermoplastic ball 72 having a central flow passage 84 and a vent hole 102 in the side wall oriented toward the downstream position when closed. Rotation of the shear stem 82 and ball 72 engaged thereby, to the valve closed position, permits venting of the downstream line through the vent hole 81 of the bonnet 80 to the atmosphere, a container, or to bleed into in-transit inventory such as the pipeline.

Accordingly, the plastic vented ball valve 20 designed in this manner does not require that the valve ball 72 be seated extremely tight against the seats formed by the first annular support member 77 and the second annular support member 116 so as to deform the valve ball 72 or cause premature wear. Instead of attempting to trap the fluid, gas vapor, or air between the valve ball 72 and seat seals (77 and 116) within the tubular valve body 38, when the valve 20 is in the closed position, the fluid from the downstream portion of the conduit is permitted to flow through the downstream valve ball vent hole 102 and seep around the peripheral edges 104, 106 of the valve ball 72 and tubular valve body 38. The flow of the fluid which seeps around the valve ball 72 is controlled by the novel design and function of the vented ball valve shear stem 82 formed having a axial groove 94 and at least one upwardly extending arch 96 on at least one side containing an annular seal member 98 for providing a seal either below or above the bonnet vent hole 81 depending upon the rotation of the shear stem 82 by the handle 91. A tight seal is provided between the annular seat seals (77 and 116), and the tubular valve body 38 by the incorporation of additional O-rings 47, 140, and 146 in the body and O-ring 98 within the shear stem 82.

More particularly, in the valve open full flow position, the valve ball 72 seals the downstream side of the ball vent hole 102 against the side wall of the valve body between the annular seat seals (77 and 116) and aligns the valve ball throughbore 84 into flow-through alignment with the flow passage 69 and the first and second flow-through ends of the tubular valve body 38. Furthermore, in the open position, the annular sealing member 98 or O-ring within the offset arched portion 96 of the axial groove 94 is positioned below or over the vent hole 81 in the valve bonnet 80 providing a seal between the shear stem 82 and the bonnet stem receiving passage 78 within the bonnet 80 preventing vapor or liquid fluid from leaking through the valve body bonnet vent hole 81.

Rotation of the handle 91 to the valve closed position, rotates the shear stem 82 and valve ball 72 out of flow-through alignment so that the ball vent 102 is oriented in the downstream direction opposite end wall 41. The annular seat seals (77 and 116) on which the valve ball 72 is seated provides a seal between the tubular valve body 38 and exterior surface 86 of the valve ball 38, whereby the ball vent is in flow communication with the first or second flow-through ends providing flow communication with the vapors contained in the downstream conduit or pipeline. Rotation of the shear stem 82, positions the offset arched portion containing O-ring 98 above the valve body vent hole 81 in the valve bonnet 80. The residual downstream vapor and/or liquid fluid in the pipeline passes through the downstream ball vent hole 102 into the throughbore 84, seeps around the peripheral edges (104, 106) of the valve ball 72 and valve receiving chamber 70 of the tubular valve body 38, between the valve body bonnet stem receiving passage 78 and the shear stem 82, and out of the bonnet vent hole 81 positioned below the offset arched portion 96 of the stem O-ring 98. The flow of the fluid and venting of pressurized vapor from the downstream portion of the pipeline through the valve ball member vent hole 102 to the atmosphere through the valve body bonnet vent hole 81 provides for safe disassembly of the valve and or sections of the pipeline.

An alternate embodiment of the vented ball valve 22 as shown in FIGS. 8–11, may be provided with a generally axial groove 94 having at least one offset defining an arch 96 around a portion of its circumference and having a generally horizontal portion having an annular sealing member 98 such as an O-ring being disposed therein being positioned above the valve body bonnet vent hole 81. The arched portion 96 and the annular sealing member 98 therein extends below the valve body bonnet vent hole 81, so that rotating the shear stem 82 and valve member 84 into flow-through alignment positions the arched portion 96 and annular sealing member 98 therein below or over the valve body bonnet vent hole 81 sealing the valve body bonnet vent hole 81. Rotation of the shear stem 82 and the valve member 84 out of flow-through alignment rotates the axial groove 94 and annular sealing member 98 therein above the valve body bonnet vent hole 81 providing venting flow communication from the atmosphere through the valve body bonnet vent hole 81, between the shear stem 82 and the stem receiving passage 78, the valve receiving chamber 70 of the tubular valve body 38, the valve member vent hole 102, and the first or second flow-through ends of the tubular valve body 38.

Another embodiment of the vented valve 10 may combine the features of the preferred embodiment shown in FIGS. (1, 4, 5, 6, and 7) having an upward offset 96 with the features of the alternate embodiment shown in FIGS. (8–11) having a downward offset 96 to incorporate a plurality of valve body vent holes 81 at positions below, above, or spaced apart from one another around the circumference of the valve body bonnet 80. A complementary axial groove 94 having one of more offset portions 96 extending upward, downward, or even upward and downward around the circumference of the shear stem 82 including one or more annular sealing members 98 therein can be used in combination with the venting holes 81 at various positions for use in multi-stream valves such as 3-way valves commonly used in the chemical processing industry.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A ball valve with shear stem comprising:
   a valve body having first and second flow-through ends with a valve member receiving chamber thereinbetween and a collar extending upward from said valve body including a stem receiving passage;
   a valve member disposed within said valve member receiving chamber, said valve member having a throughbore therein in operable alignment with said first and second flow-through ends;
   a shear stem disposed within said stem receiving passage in cooperative engagement with said valve member for rotational movement in and out of flow-through alignment with said first and second ends; and
   said shear stem including an outer stem sealing member comprising a secondary circumferential groove and a secondary annular sealing member, and an inner stem sealing member comprising a primary circumferential groove and a primary annular sealing member positioned within said stem receiving passage between said valve member and said outer stem sealing member, said secondary annular sealing member presents fluid leakage from passing beyond said outer stem sealing member, when fluid leaks past said inner stem sealing member, wherein said outer stem sealing member is designed to shear and break away at said circumferential groove above inner stem sealing member, and wherein said inner stem sealing member prevents leakage from said valve member upon said shearing and breaking away of said outer stem sealing member when excessive force is applied to said shear stem.

2. The ball valve with shear stem of claim 1, wherein said secondary circumferential groove is continuous.

3. The ball valve with shear stem of claim 1, wherein said secondary circumferential groove is formed having a deeper groove than said primary circumferential groove.

4. The ball valve with shear stem of claim 1, wherein said secondary circumferential groove is formed having a wider groove than said primary circumferential groove.

5. The ball valve with shear stem of claim 1, wherein said secondary circumferential groove is formed having a deep "V" shape in order to shear before the primary circumferential groove in order to provide a safety means for preventing fluid leakage due to shearing of the said shear stem at said secondary circumferential groove.

6. The ball valve with shear stem of claim 1, wherein said valve member is a generally spherical shaped ball having a throughbore therethrough.

7. The ball valve with shear stem of claim 1, wherein said valve member is generally cylindrical shaped plug having a throughbore therethrough.

8. The ball valve with shear stem of claim 1, further comprising atmospheric vent means being in selected flow communication with a downstream portion of said valve body, said atmospheric vent means being in cooperative engagement with said valve member for simultaneous rotational movement therewith, wherein said atmospheric vent means is in flow communication with said downstream portion only when said valve member is in out-of-flow alignment with said valve body first and second ends.

9. The ball valve with shear stem of claim 8, wherein at least said primary circumferential groove of said shear stem includes a generally axial groove having at least one offset around a portion of its circumference, said groove including an annular sealing member disposed therein sealingly biased against said stem receiving passage and alignable above or below said valve body vent hole.

10. The ball valve with shear stem of claim 9, wherein said offset portion of said axial groove extends axially around said shear stem for about one fourth of the circumference of said shear stem.

11. The ball valve with shear stem of claim 9, wherein said stem includes a generally axial groove having a pair of offset portions opposite one another around the circumference of said stem.

12. The ball valve with shear stem of claim 8, wherein said atmospheric vent means comprises a valve member vent hole, said valve member vent hole being in flow communication with said valve body downstream portion and with said valve member throughbore, a valve body vent, and a stem receiving passageway being in flow communication with said valve member throughbore, said stem receiving passageway being in flow communication with said valve body vent only when said valve member is in out-of-flow alignment with said valve body first and second ends.

13. The ball valve with shear stem of claim 1, wherein said valve is comprised of thermoplastic materials.

* * * * *